(12) United States Patent
Faruque et al.

(10) Patent No.: US 10,343,642 B2
(45) Date of Patent: Jul. 9, 2019

(54) VEHICLE AIRBAG

(71) Applicant: Ford Global Technologies, LLC, Dearborn, MI (US)

(72) Inventors: Mohammad Omar Faruque, Ann Arbor, MI (US); S.M. Iskander Farooq, Oakland, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 27 days.

(21) Appl. No.: 15/623,016

(22) Filed: Jun. 14, 2017

(65) Prior Publication Data

US 2018/0361981 A1  Dec. 20, 2018

(51) Int. Cl.

| | |
|---|---|
| *B60N 2/14* | (2006.01) |
| *B60R 21/20* | (2011.01) |
| *B60R 21/214* | (2011.01) |
| *B60R 21/231* | (2011.01) |
| *B60R 21/232* | (2011.01) |
| *B60R 21/261* | (2011.01) |

(52) U.S. Cl.
CPC ............ *B60R 21/232* (2013.01); *B60R 21/20* (2013.01); *B60R 21/214* (2013.01); *B60R 21/23184* (2013.01); *B60R 21/261* (2013.01); *B60N 2/14* (2013.01); *B60R 2021/23107* (2013.01); *B60R 2021/23161* (2013.01); *B60R 2021/2615* (2013.01)

(58) Field of Classification Search
CPC ..... B60R 21/232; B60R 21/214; B60R 21/20; B60R 21/261; B60R 21/23184; B60R 2021/23107; B60R 2021/2615; B60R 2021/23161; B60N 2/14
See application file for complete search history.

(56) References Cited

U.S. PATENT DOCUMENTS

| | | | | |
|---|---|---|---|---|
| 3,747,952 A | * | 7/1973 | Graebe ................. | B60R 21/205 137/67 |
| 3,795,412 A | * | 3/1974 | John ...................... | B60R 21/08 180/274 |

(Continued)

FOREIGN PATENT DOCUMENTS

| | | |
|---|---|---|
| DE | 102014000863 A1 | 8/2014 |
| FR | 2931420 A1 | 11/2009 |

(Continued)

OTHER PUBLICATIONS

Search Report from United Kingdom Intellectual Property Office dated Nov. 26, 2018 regarding Application No. 1809624.8 (4 pages).

*Primary Examiner* — Drew J Brown
(74) *Attorney, Agent, or Firm* — Frank A. MacKenzie; Bejin Bieneman PLC

(57) ABSTRACT

A passive restraint includes inflatable members inflatable to an inflated position. The inflatable members are elongated along a longitudinal axis and spaced from each other in a lateral direction in the inflated position. The passive restraint includes uninflatable panels arranged in an alternating arrangement with the inflatable members. Each panel is elongated in the lateral direction when the inflatable members are inflated and extends from one of the inflatable members to another one of the inflatable members.

20 Claims, 9 Drawing Sheets

(56) References Cited

U.S. PATENT DOCUMENTS

| | | | |
|---|---|---|---|
| 7,195,276 B2* | 3/2007 | Higuchi | B60R 21/231 |
| | | | 280/729 |
| 8,573,634 B2 | 11/2013 | Choi et al. | |
| 8,602,448 B2 | 12/2013 | Choi et al. | |
| 8,851,509 B1* | 10/2014 | Choi | B60R 21/217 |
| | | | 280/730.1 |
| 9,321,423 B2* | 4/2016 | Jaradi | B60R 21/015 |
| 9,340,126 B2 | 5/2016 | Cuddihy et al. | |
| 9,725,064 B1* | 8/2017 | Faruque | B60N 2/143 |
| 9,789,840 B2* | 10/2017 | Farooq | B60N 2/14 |
| 9,902,362 B2* | 2/2018 | Farooq | B60N 2/01 |
| 2008/0197611 A1 | 8/2008 | Kabata | |
| 2012/0133114 A1* | 5/2012 | Choi | B60R 21/214 |
| | | | 280/728.2 |
| 2013/0069348 A1 | 3/2013 | Choi et al. | |
| 2016/0031401 A1 | 2/2016 | Jaradi et al. | |
| 2016/0264021 A1* | 9/2016 | Gillett | B60K 1/04 |
| 2018/0065585 A1* | 3/2018 | Jaradi | B60R 21/233 |
| 2018/0215338 A1* | 8/2018 | Faruque | B60R 21/0136 |

FOREIGN PATENT DOCUMENTS

| | | | |
|---|---|---|---|
| GB | 2385303 A | 8/2003 | |
| JP | 2003182503 A | 7/2003 | |
| JP | 2004148853 A | 5/2004 | |
| JP | 2016088413 A | 5/2016 | |
| KR | 1020090062624 A | 6/2009 | |

* cited by examiner

VEHICLE AIRBAG

BACKGROUND

Vehicles may include a variety of airbags deployable during vehicle impacts to absorb energy from occupants of the vehicles during the impact. The airbag may be a component of an airbag assembly including a housing supporting the airbag, and an inflation device in communication with the airbag for inflating the airbag from an uninflated position to an inflated position. The airbag assemblies may be supported on a steering wheel of the vehicle, an instrument panel of the vehicle, etc.

BRIEF DESCRIPTION OF THE DRAWINGS

FIG. 7 4 is a perspective view of another embodiment of a passive restraint in an inflated position.

DETAILED DESCRIPTION

Figure 1:
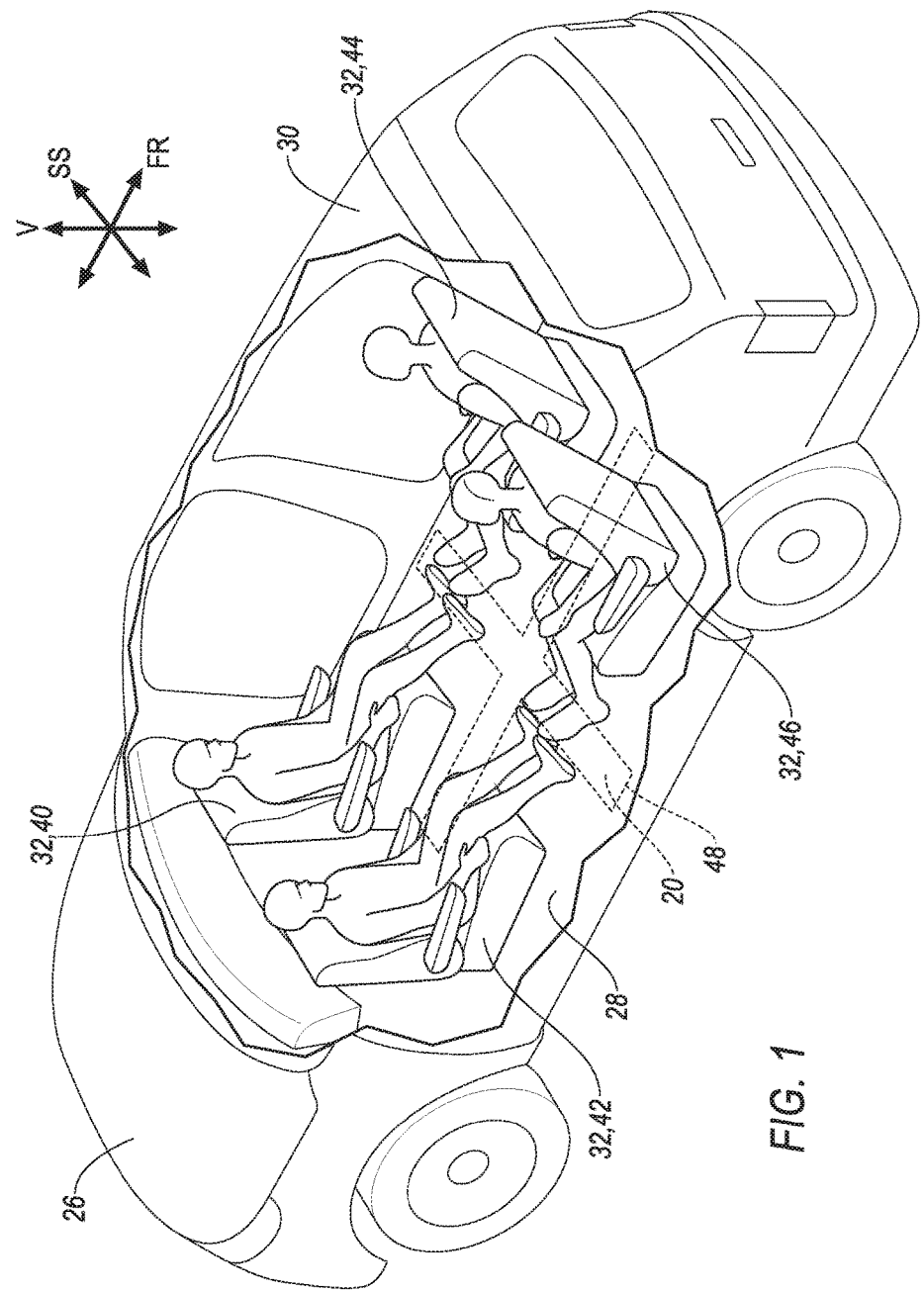
FIG. 1 is a perspective view of a vehicle including a passive restraint supported by a floor of the vehicle with the passive restraint in an uninflated position.

A passive restraint includes inflatable members inflatable to an inflated position. The inflatable members are elongated along a longitudinal axis in the inflated position. The inflatable members are spaced from each other in a lateral direction in the inflated position. The passive restraint includes uninflatable panels arranged in an alternating arrangement with the inflatable members. Each panel is elongated in the lateral direction when the inflatable members are inflated. Each panel extends from one of the inflatable members to another one of the inflatable members.

A cross section of at least one of the inflatable members may be circular.

The panels may be aligned in a common plane.

The panels may be elongated along the longitudinal axis.

The uninflatable panels may each include a plurality of segments extending from one of the inflatable members to another one of the inflatable members. The segments may be spaced apart from each other along the longitudinal axis.

The passive restraint may include an inflation pipe having a first port and a second port. The first port may be positioned to provide fluid to one of the inflatable members. The second port may be positioned to provide fluid to another one of the inflatable members.

The passive restraint may include an inflation pipe having a plurality of ports. Each of the plurality of ports may be positioned to provide fluid to a separate inflatable member of the inflatable members.

The passive restraint may include a plurality of inflation pipes extending from a central junction. The plurality of inflation pipes may be in fluid communication with the inflatable members.

One of the plurality of inflation pipes may be perpendicular to another of the plurality of inflation pipes.

The central junction may include a buffer chamber.

The passive restraint may include an inflator disposed within the buffer chamber.

The panels may be formed of fabric.

The panels and the inflatable members may define a plurality of curtains extending outwardly from a center point.

One of the plurality of curtains may be perpendicular to another one of the plurality of curtains.

A vehicle includes seats spaced from each other. The vehicle includes inflatable members inflatable to an inflated position. The inflatable members in the inflated position are disposed between the seats. The inflatable members are elongated along a longitudinal axis. The inflatable members are spaced from each other in a lateral direction. The vehicle includes uninflatable panels arranged in an alternating arrangement with the inflatable members. Each panel is elongated in the lateral direction when the inflatable members are inflated. Each panel extends from one of the inflatable members to another one of the inflatable members.

The vehicle may include a floor. The inflatable members may be supported by the floor.

The vehicle may include a roof. The inflatable members may be supported by the roof.

The panels and the inflatable members may define a curtain extending in a vehicle front-to-rear direction.

The panels and the inflatable members may define a plurality of curtains extending outwardly from a center point. One of the plurality of curtains may extend in a vehicle front-to-rear direction. Another one of the plurality of curtains may extend in a vehicle side-to-side direction.

The vehicle may include a floor. The seats may be rotatability supported by the floor.

The vehicle may include a plurality of inflation pipes extending from a central junction and in fluid communication with the inflatable members.

One of the plurality of inflation pipes may be perpendicular to another of the plurality of inflation pipes.

The central junction may include a buffer chamber.

The vehicle may include an inflator disposed within the buffer chamber.

With reference to the Figures, wherein like numerals indicate like parts throughout the several views, a passive restraint 20 includes inflatable members 22. The inflatable members 22 are inflatable to an inflated position. In the inflated position the inflatable members 22 are elongated along a longitudinal axis A and spaced from each other in a lateral direction L. The passive restraint 20 includes uninflatable panels 24. The uninflatable panels 24 are arranged in an alternating arrangement with the inflatable members 22. Each panel 24 is elongated in the lateral direction L when the inflatable members 22 are inflated. Each panel 24 extends from one of the inflatable members 22 to another one of the inflatable members 22.

Figure 2:
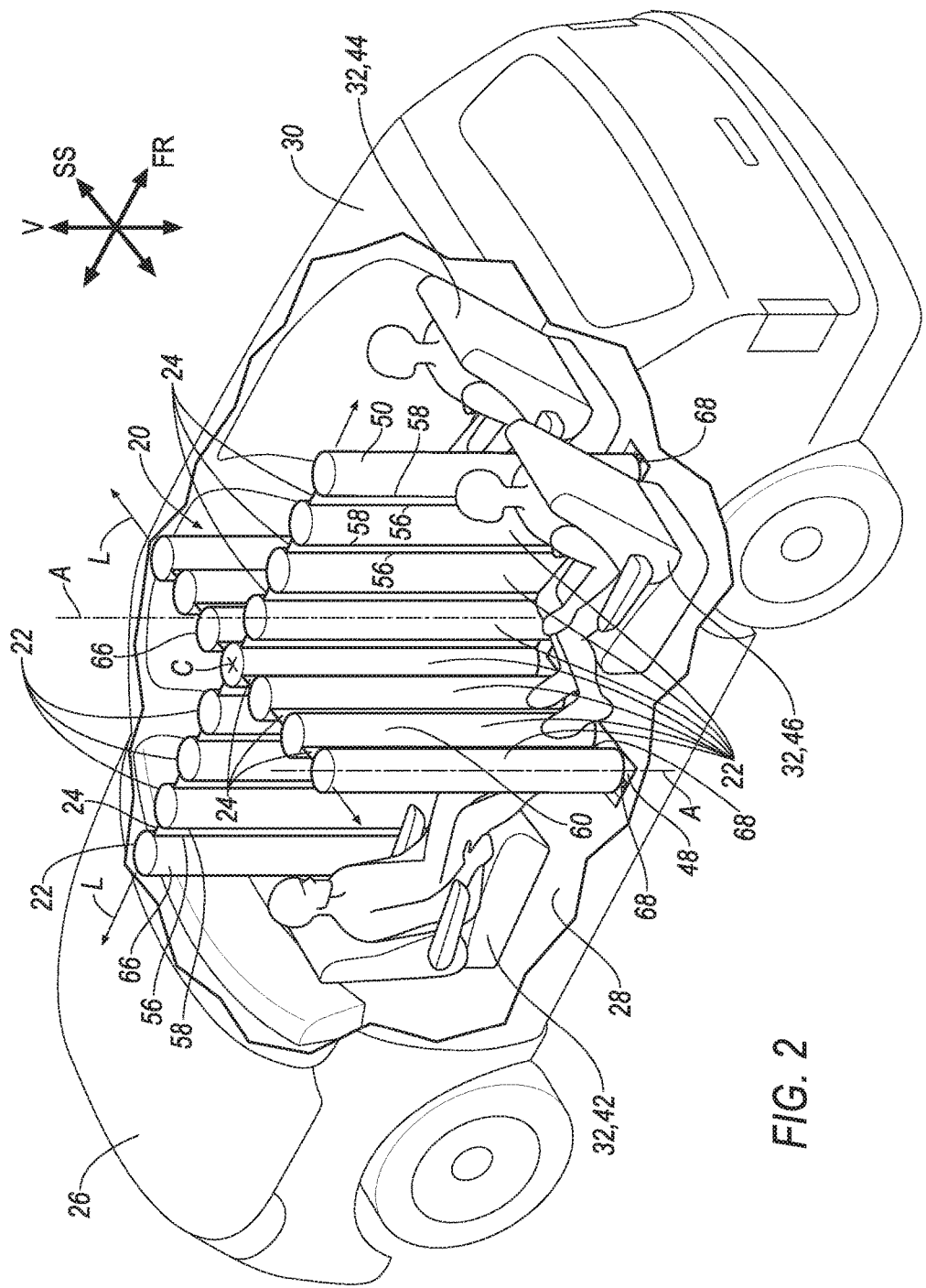
FIG. 2 is a perspective view of the vehicle including the passive restraint of FIG. 1 in an inflated position.
Figure 3:
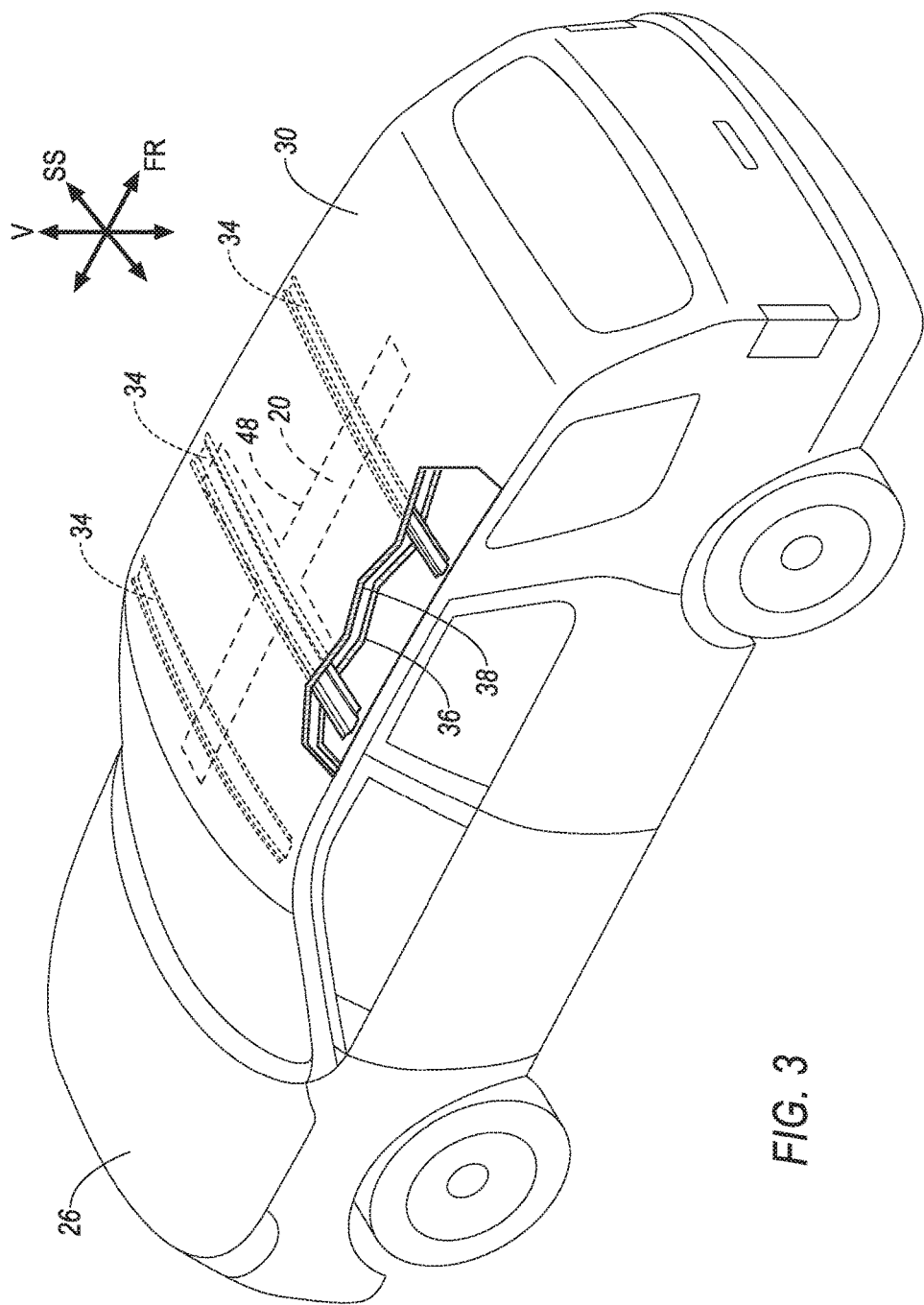
FIG. 3 is a perspective view of a vehicle including a passive restraint supported by a roof of the vehicle with the passive restraint in an uninflated position.
Figure 4:
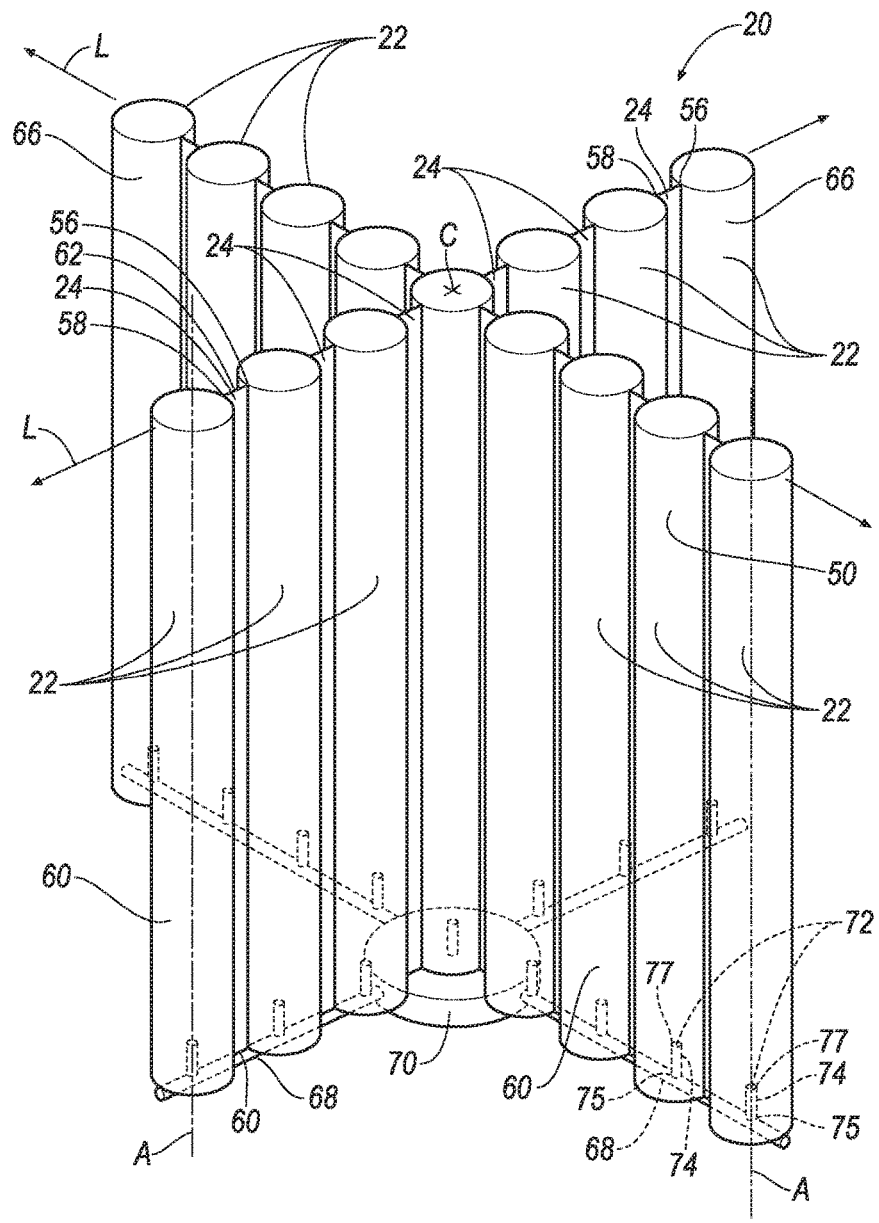
FIG. 4 is a perspective view of the passive restraint of FIG. 2 in the inflated position.
Figure 5:
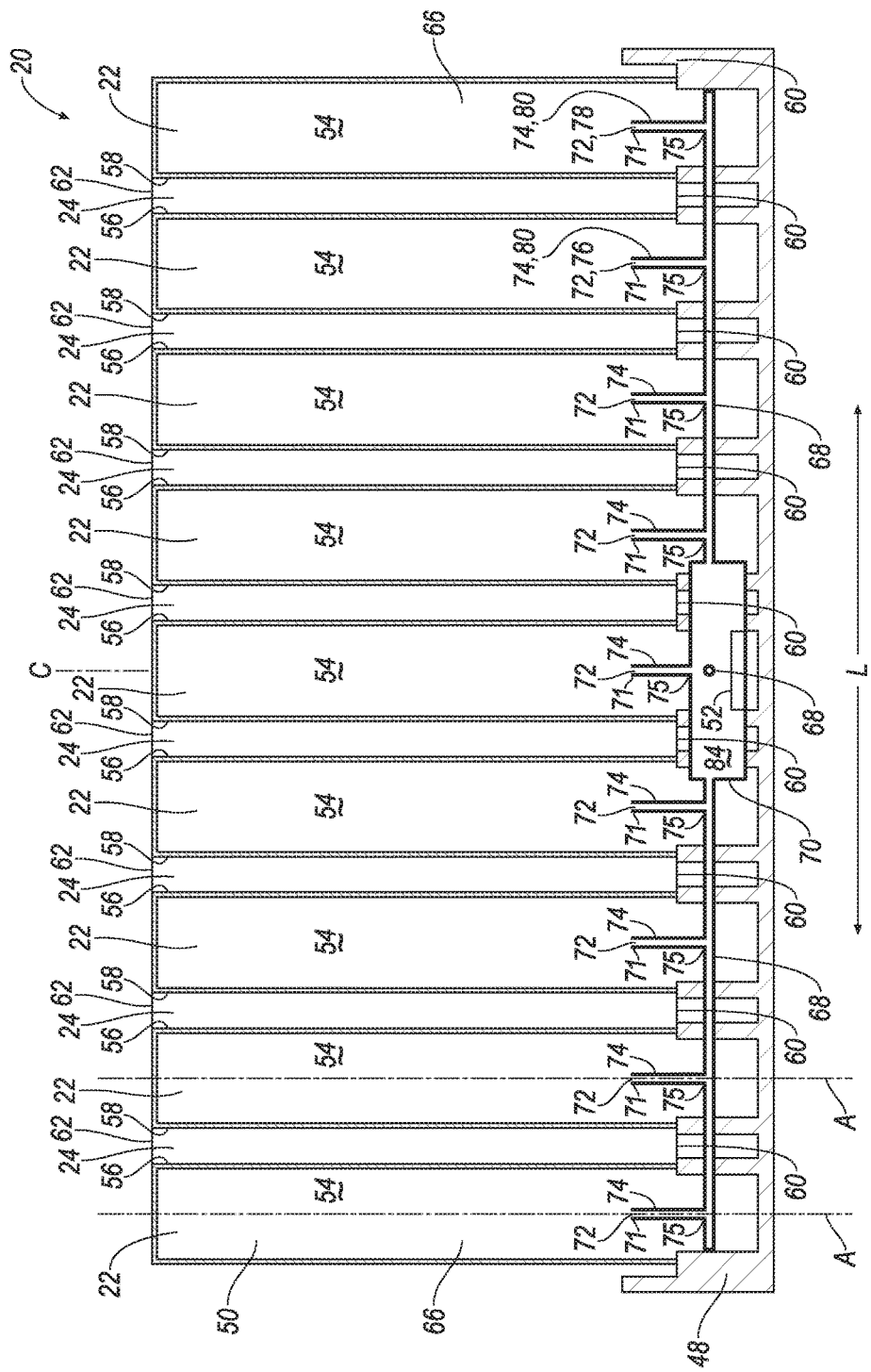
FIG. 5 is a cross section view of the passive restraint of FIG. 4 taken parallel to a longitudinal axis A.

With reference to FIGS. 1-3, a vehicle 26 may include a floor 28, a roof 30, seats 32, and the passive restraint 20, i.e., an airbag module. The vehicle 26 may define a front-to-rear direction FR, a side-to-side direction SS, and a vertical direction V. The vehicle 26 may include any passenger or commercial automobile such as a car, a truck, a sport utility vehicle, a crossover vehicle, a van, a minivan, a taxi, a bus, etc.

The floor 28 may extend over a substantial lower portion of the vehicle 26. Other components, e.g., the seats 32, upholstery, center console, etc., of the vehicle 26 may be mounted to and/or supported by the floor 28.

As shown in FIG. 3, the roof 30 may include a plurality of roof 30 support beams 34, a headliner 36, and an exterior panel 38. The beams 34 are disposed between the exterior panel 38 and headliner 36.

Each of the seats 32 may include a seat back, a seat bottom, and a headrest. The headrest may be supported by the seat back and may be stationary or movable relative to the seat back. The seat back may be supported by the seat bottom and may be stationary or movable relative to the seat bottom. The seats 32 may be located relative to the vehicle 26 front-to-rear direction FR and/or the vehicle 26 side-to-side direction SS, e.g., a front-right seat 40, a front-left seat 42, a rear-right seat 44, and a rear-left seat 46. The vehicle 26 may include more or less seats 32 than shown. For example the vehicle 26 may include only the front-right seat 40 and front-left seat 42, the vehicle 26 may include a third row of seats (not shown), etc.

The seats 32 may be spaced from each other. For example, the front-right seat 40 and the front-left seat 42 may be spaced from the rear-right seat 44 and the rear-left seat 46 in the vehicle 26 front-to-rear direction FR. The front-right seat 40 and the rear-right seat 44 may be spaced from the front-left seat 42 and the rear-left seat 46 in the vehicle 26 side-to-side direction SS. The spacing between the seats 32 may be sufficient to allow the passive restraint 20 to be inflated therebetween.

The seats 32 may be rotatability supported by the floor 28. The seats 32 may be rotatable relative to the floor 28 about an axis transverse to the floor 28. The seat bottom and the seat back may rotate together as a unit about the axis that is transverse to the floor 28. For example, the front seats 40, 42 may be rotatable to face the rear seats 44, 46. Similarly, the left seats 42, 46 may be rotated to face the right seats 40, 44 and vice versa.

The passive restraint 20 may include a housing 48, an airbag 50 supported by the housing 48, and an inflator 52 in communication with the airbag 50. The inflator 52 and the airbag 50 may be disposed in the housing 48 in an uninflated position, e.g., the housing 48 may define a cavity that houses the airbag 50 and the inflator 52 in the uninflated position. The airbag 50 may be rolled and/or folded in the uninflated position to fit within the housing 48. The housing 48 provides a reaction surface for the airbag 50 in the inflated position. The housing 48 may be supported by, for example, the floor 28, the roof 30, etc. The housing 48 may be formed of any material, e.g., a rigid polymer, a metal, a composite, etc.

With reference to FIGS. 1 and 3, the passive restraint 20 is shown as a component of the vehicle 26 and in the uninflated position. As shown in FIG. 1, the passive restraint 20 may be supported by the floor 28 of the vehicle 26. As shown in FIG. 3, the passive restraint 20 may be supported by the roof 30 of the vehicle 26.

With reference to FIG. 2, the passive restraint 20 is shown as a component of the vehicle 26 and in the inflated position. In the inflated position, the airbag 50, including each of the inflatable members 22, is filled with gas from the inflator 52. The inflated airbag 50 extends between the seats 32.

With reference to FIGS. 2 and 4-7, the airbag 50 of the passive restraint 20 includes the inflatable members 22. The airbag 50 of the passive restraint 20 includes the uninflatable panels 24. The airbag 50 may be a single sheet of material or may be multiple sheets of material connected together, e.g., by stitching.

The airbag 50, including the inflatable members 22 and the uninflatable panels 24, may be formed of a woven polymer fabric or any other suitable material. As one example, the airbag 50 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The inflatable members 22 may be formed of the same material as the uninflatable panels 24.

The inflatable members 22 are inflatable to the inflated position. The inflatable members 22 each define an inflation chamber 54. In the inflated position, the inflatable members 22 are elongated along the longitudinal axis A and spaced from each other in the lateral direction L. The longitudinal axis A is perpendicular to the lateral direction L. For example, as shown in FIG. 2, when the passive restraint 20 is a component of the vehicle 26, the longitudinal axis A may extend in the vehicle 26 vertical direction V. The lateral direction L may extend in the vehicle 26 front-to-rear FR direction or the vehicle 26 side-to-side direction SS.

Figure 6:
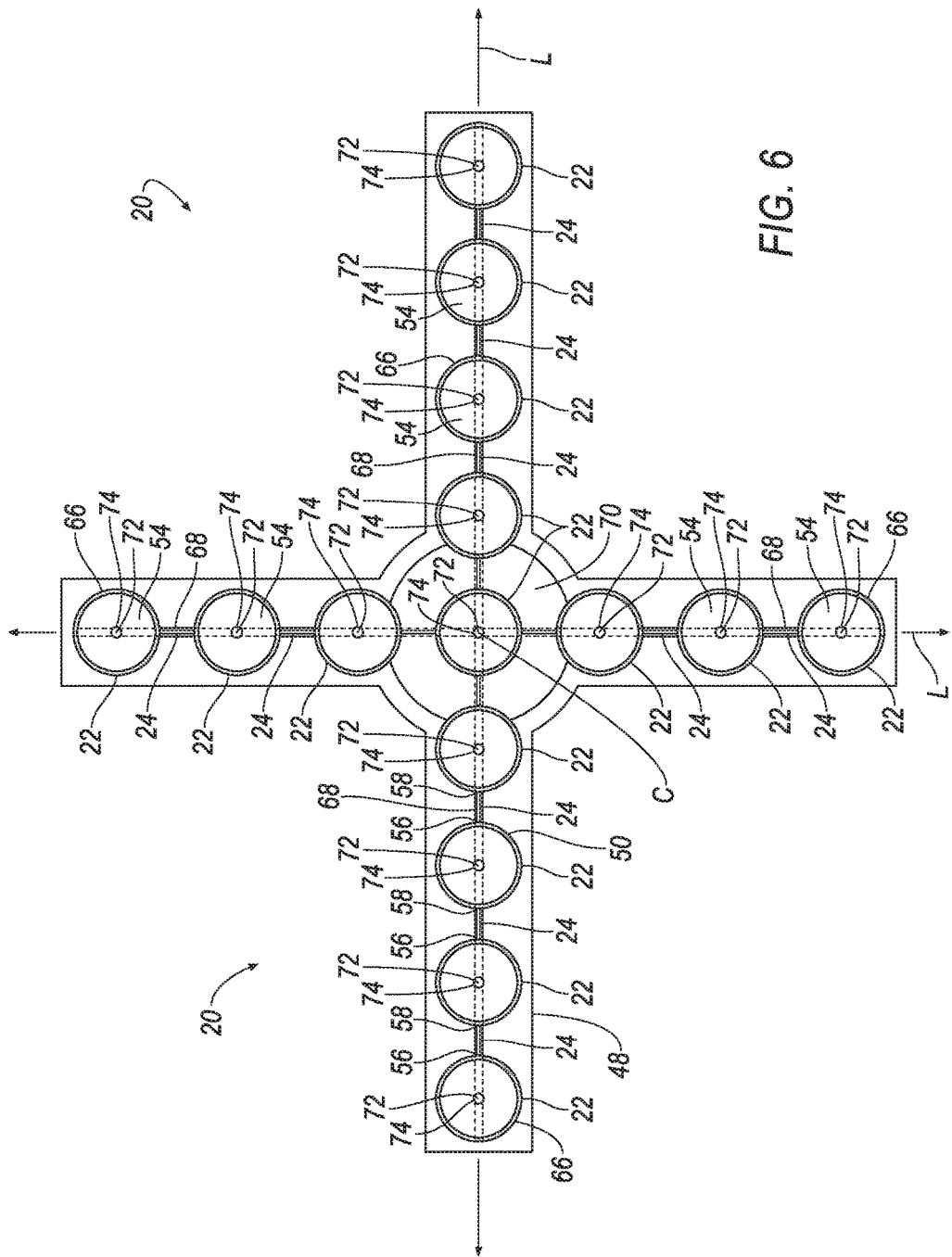
FIG. 6 is a cross section view of the passive restraint of FIG. 4 taken perpendicular to the longitudinal axis A.

The inflatable members 22 may be cylindrical in shape. Ends of the cylinders may be flat, rounded, etc. A cross section of at least one of the inflatable members 22 is circular. For example, FIG. 6 illustrates a cross section of the airbag 50 taken along a plane perpendicular to the longitudinal axis A showing the circular shape of the cross section of the inflatable members 22. The cross section of the inflatable members 22 may deviate from being circular as a result of the pliable material forming the airbag 50.

With reference again to FIG. 2, the inflatable members 22 in the inflated position are disposed between the seats 32. The inflatable members 22 may be disposed where the left seats 42, 46 are spaced from the right seats 40, 44. The inflatable members 22 may be disposed where the front seats 40, 42 are spaced from the rear seats 44, 46.

The inflatable members 22 may be supported by the floor 28. For example, the airbag 50, including the inflatable members 22, may be supported by the housing 48 of the passive restraint 20 that is supported by the floor 28, as shown in FIGS. 1 and 2. Similarly, the inflatable members 22 may be supported by the roof 30, e.g., via the airbag 50 being supported by the housing 48 of the passive restraint 20 that is supported by the roof 30, as shown in FIG. 3.

Returning to FIGS. 2 and 4-7, the uninflatable panels 24 are arranged in an alternating arrangement with the inflatable members 22. Each inflatable panel 24 is elongated in the lateral direction L when the inflatable members 22 are inflated. Each inflatable panel 24 extends from one of the inflatable members 22 to another one of the inflatable members 22. For example, each inflatable panel 24 may include a first end 56 and a second end 58. The first end 56 is spaced apart from the second end 58 in the lateral direction L. The first end 56 is secured to one of the inflatable members 22. The second end 58 is secured to another one of the inflatable members 22. The ends 56, 58 of the uninflatable panel 24 may be secured to the inflatable members 22 by stitching, by being formed of a common sheet of material, etc., or some combination thereof.

The uninflatable panels 24 may be elongated along the longitudinal axis A. For example, each inflatable panel 24 may include a third end 60 and a fourth end 62. The third end 60 is spaced from the fourth end 62 along the longitudinal axis A with the uninflatable panel 24 24 extending therebetween.

The uninflatable panels 24 may be aligned in a common plane. For example, the plane may extend along the longitudinal axis A and the lateral direction L. The plane may extend in the vehicle 26 vertical direction V and the vehicle 26 front-to-rear direction FR. The plane may extend in the vehicle 26 vertical direction V and the vehicle 26 side-to-side direction SS. The longitudinal axis A of the inflatable members 22 may be in the common plane with the uninflatable panels 24.

Figure 7:
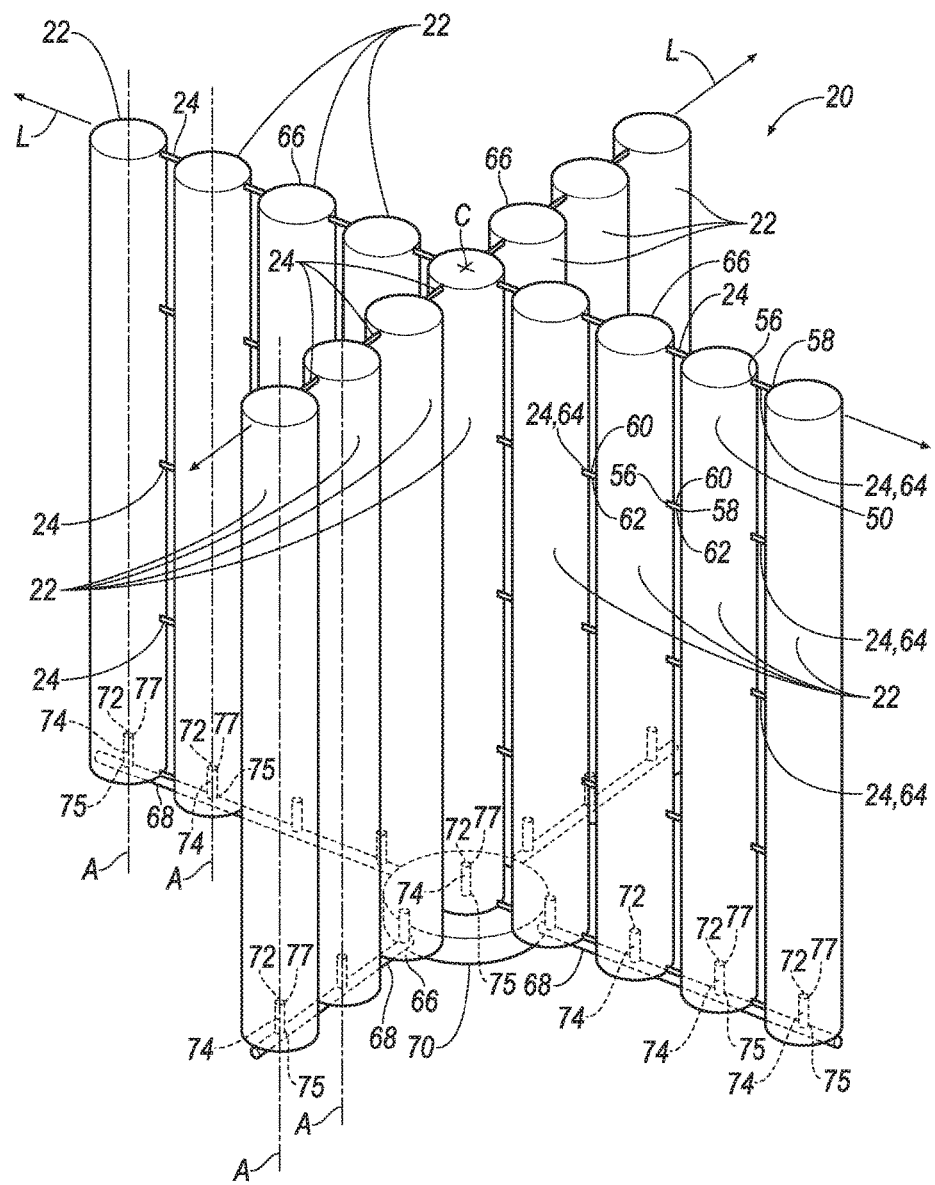
Figure 8:
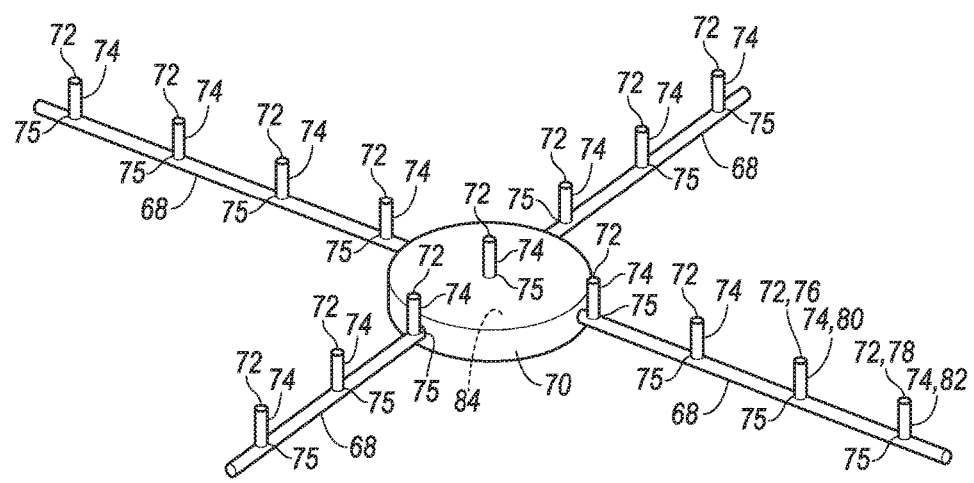
FIG. 8 is a perspective view of inflation pipes and a central junction of the passive restraint.

With reference to FIG. 7, the uninflatable panels 24 may each include a plurality of segments 64 extending from one of the inflatable members 22 to another one of the inflatable members 22. The segments 64 may be spaced apart from each other along the longitudinal axis A. Each of the segments 64 may be elongated along the longitudinal axis A, e.g. between the third end 60 and the fourth end 62, by an amount that is less than the lateral elongation of the uninflatable panel 24 between the inflatable members 22, e.g., between the first end 56 and the second end 58.

Returning to FIGS. 2 and 4-7, the uninflatable panels 24 and the inflatable members 22 may define a curtain 66. The curtain 66 may extend in the vehicle 26 front-to-rear direction FR, as shown in FIG. 2. The curtain 66 may isolate the front-right seat 40 from the front-left seat 42. The curtain 66 may isolate the rear-right seat 44 from the rear-left seat 46. The curtain 66 may extend in the vehicle 26 side-to-side direction SS. The curtain 66 may isolate the front-left seat 42 from the rear-left seat 46. The curtain 66 may isolate the front-right seat 40 from the rear-right seat 44.

The uninflatable panels 24 and the inflatable members 22 may define a plurality of curtains 66 extending outwardly from a center point C. The plurality of curtains 66 may isolate each of the seats 32 from the other seats 32. For example, the plurality of curtains 66 may isolate the front-right seat 40 from the front-left seat 42, the rear-right seat 44, and the rear-left seat 46.

One of the plurality of curtains 66 may be perpendicular to another one of the plurality of curtains 66. For example, one of the plurality of curtains 66 may extend from the center point C at a ninety-degree angle relative to another of the curtains 66. As shown in FIG. 2, one of the plurality of curtains 66 may extend in the vehicle 26 front-to-rear direction FR, and another of the plurality of curtains 66 may extend in the vehicle 26 side-to-side direction SS.

With reference to FIGS. 2 and 4-8, The passive restraint 20 may include a plurality of inflation pipes 68. The inflation pipes 68 extend from a central junction 70. The inflation pipes 68 are in fluid communication with the inflatable members 22. Each of the inflation pipes 68 may provide fluid to one of the curtains 66 of the plurality of curtains 66. The inflation pipes 68 may be supported by the housing 48. The inflation pipes 68 may be rigid. The inflation pipes 68 may be formed of plastic or other similar suitable material.

One of the plurality of inflation pipes 68 may be perpendicular to another of the plurality of inflation pipes 68. For example, one of the plurality of inflation pipes 68 may extend from the central junction 70 at a ninety-degree angle relative to another of the inflation pipes 68. One of the plurality of inflation pipes 68 may extend in the vehicle 26 front-to-rear direction FR, and another of the plurality of inflation pipes 68 may extend in the vehicle 26 side-to-side direction SS. The plurality of inflation pipes 68 may extend along a common plane, e.g., extending in the vehicle 26 front-to-rear FR direction and the vehicle 26 side-to-side direction SS.

Each inflation pipe 68 includes a plurality of ports 72. The ports 72 provide egress of fluid out of the inflation pipes 68. Each of the plurality of ports 72 may be positioned to provide fluid to a separate inflatable member 22 of the inflatable members 22. For example, the inflation pipes 68 may include a plurality of fill tubes 74. The fill tubes 74 may extend perpendicularly from the inflation pipes 68. The fill tubes 74 may extend along the longitudinal axis A. Each fill tube 74 may include a proximate end 75 and a distal end 77. The ports 72 may be located at the distal ends 77. Each distal end 77 may be disposed within a separate inflatable member 22. Fluid may enter the fill tube 74 at the proximate end 75 and exit the port 72 at the distal end 77 into the inflatable member 22.

Similarly, the inflation pipes 68 may include a first port 76 and a second port 78. The first port 76 may be positioned to provide fluid to one of the inflatable members 22, e.g., via a first fill tube 80. The second port 78 may be positioned to provide fluid to another one of the inflatable members 22, e.g., via a second fill tube 82.

The central junction 70 is in fluid communication with the inflation pipes 68. The central junction 70 may include one or more ports 72 and fill tubes 74. The central junction 70 is in fluid communication with the inflator 52. Fluid, e.g., gas, from the inflator 52 may be received by the central junction 70. The central junction 70 provides the fluid to the inflation pipes 68. The central junction 70 may be rigid. The central junction 70 may be formed of plastic or other similar suitable material. The central junction 70 may be formed of the same material as the inflation pipes 68.

The central junction 70 may include a buffer chamber 84. The buffer chamber 84 is of sufficient volume that generally constant fluid pressure is provided to the inflation pipes 68 despite variations in flow resistance and rate caused by the airbag 50 unrolling and/or unfolding during inflation. The inflator 52 may be disposed within the buffer chamber 84.

Figure 9:
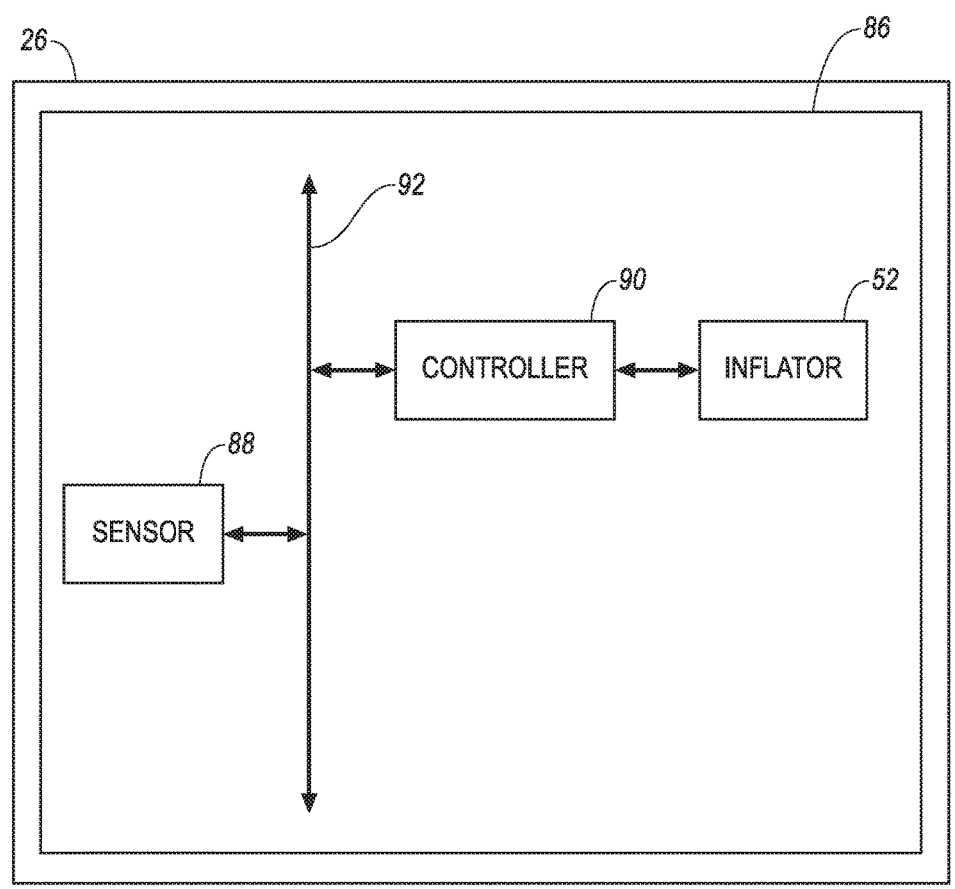
FIG. 9 is a schematic of an impact sensing system of the vehicle.

With reference to FIG. 9 the vehicle 26 includes an impact sensing system 86. The impact sensing system 86 may include at least one impact sensor 88 for sensing impact of the vehicle 26, and a controller 90 in communication with the impact sensor 88 and the inflator 52. The controller 90 may activate the inflator 52, e.g., provide an impulse to a pyrotechnic charge of the inflator 52, when the impact sensor 88 senses an impact of the vehicle 26. Alternatively or additionally to sensing impact, the impact sensing system 86 may be configured to sense impact prior to impact, i.e., pre-impact sensing.

The impact sensor 88 may be in communication with the controller 90. The impact sensor 88 is configured to detect an impact to the vehicle 26. The impact sensor 88 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 88 may be located at numerous points in or on the vehicle 26.

The controller 90 may be a microprocessor-based controller 90 implemented via circuits, chips, or other electronic components. For example, the controller 90 may include a processor, memory, etc. The memory of the controller 90 may include memory for storing instructions executable by the processor as well as for electronically storing data and/or databases.

Upon receiving a signal, e.g., from the controller 90, the inflator 52 may inflate the airbag 50 with an inflatable fluid medium, such as a gas. The inflator 52 may be, for example, a pyrotechnic inflator 52 that uses a chemical reaction to drive inflation medium to the airbag 50. The inflator 52 may be of any suitable type, for example, a cold-gas inflator 52.

The controller 90 and the impact sensor 88 may be connected to a communication bus 92, such as a controller area network (CAN) bus, of the vehicle 26. The controller 90 may use information from the communication bus 92 to control the activation of the inflator 52. The inflator 52 may be connected to the controller 90, as shown in FIG. 9, or the inflator 52 may be connected directly to the communication bus 92.

In operation, the airbag 50 of the passive restraint 20 is in the uninflated position, as shown in FIGS. 1 and 3, under normal operating conditions of the vehicle 26. In the event of an impact, the impact sensor 88 may detect the impact and transmit a signal through the communication bus 92 to the controller 90. The controller 90 may transmit a signal through the communication bus 92 to the inflator 52. The inflator 52 may discharge and inflate the airbag 50 with the inflation medium from the uninflated position to the inflated position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A passive restraint comprising:
   inflatable members inflatable to an inflated position, the inflatable members being spaced from each other in the inflated position; and
   uninflatable panels arranged in an alternating arrangement with the inflatable members and extending from one of the inflatable members to another one of the inflatable members; and
   a plurality of inflation pipes extending from a central junction and in fluid communication with the inflatable members.

2. The passive restraint of claim 1, wherein a cross section of at least one of the inflatable members is circular.

3. The passive restraint of claim 1, wherein the panels are aligned in a common plane.

4. The passive restraint of claim 1, wherein the inflatable members in the inflated position and the panels are elongated along a longitudinal axis.

5. The passive restraint of claim 1, wherein the uninflatable panels each include a plurality of segments extending from one of the inflatable members to another one of the inflatable members.

6. The passive restraint of claim 1, wherein one of the inflation pipes has a first port and a second port, the first port positioned to provide fluid to one of the inflatable members, and the second port positioned to provide fluid to another one of the inflatable members.

7. The passive restraint of claim 1, wherein one of the inflation pipes has a plurality of ports, each of the plurality of ports positioned to provide fluid to a separate inflatable member of the inflatable members.

8. The passive restraint of claim 1, wherein one of the plurality of inflation pipes is perpendicular to another of the plurality of inflation pipes.

9. The passive restraint of claim 1, wherein the central junction includes a buffer chamber.

10. The passive restraint of claim 9, further comprising an inflator disposed within the buffer chamber.

11. The passive restraint of claim 1, wherein the panels are formed of fabric.

12. The passive restraint of claim 1, wherein the panels and the inflatable members define a plurality of curtains extending outwardly from a center point.

13. The passive restraint of claim 12, wherein one of the plurality of curtains is perpendicular to another one of the plurality of curtains.

14. A vehicle comprising:
   seats spaced from each other;
   inflatable members inflatable to an inflated position, the inflatable members in the inflated position being disposed between the seats and spaced from each other; and
   uninflatable panels arranged in an alternating arrangement with the inflatable members and extending from one of the inflatable members to another one of the inflatable members;
   wherein the panels and the inflatable members define a plurality of curtains extending outwardly from a center point, one of the plurality of curtains extending in a vehicle front-to-rear direction and another one of the plurality of curtains extending in a vehicle side-to-side direction.

15. The vehicle of claim 14, further comprising a floor, the inflatable members supported by the floor.

16. The vehicle of claim 14, further comprising a roof, the inflatable members supported by the roof.

17. The vehicle of claim 14, wherein the panels and the inflatable members define a curtain extending in a vehicle front-to-rear direction.

18. The vehicle of claim 14, further comprising a floor, the seats rotatability supported by the floor.

19. A passive restraint comprising:
   inflatable members inflatable to an inflated position, the inflatable members being spaced from each other in the inflated position; and
   uninflatable panels arranged in an alternating arrangement with the inflatable members, each uninflatable panel including a plurality of segments extending from one of the inflatable members to another one of the inflatable members.

20. A vehicle comprising:
   a floor;
   seats spaced from each other;
   inflatable members supported by the floor and inflatable to an inflated position, the inflatable members in the inflated position being disposed between the seats and spaced from each other; and
   uninflatable panels arranged in an alternating arrangement with the inflatable members and extending from one of the inflatable members to another one of the inflatable members.

* * * * *